US011267560B2

(12) United States Patent
Argiolas et al.

(10) Patent No.: US 11,267,560 B2
(45) Date of Patent: Mar. 8, 2022

(54) SHOCK ABSORBER DIMENSION

(71) Applicant: Airbus Operations Limited, Bristol (GB)

(72) Inventors: Adriano Argiolas, Bristol (GB); James Graham Kirk, Bristol (GB)

(73) Assignee: Airbus Operations Limited, Bristol (GB)

( * ) Notice: Subject to any disclaimer, the term of this patent is extended or adjusted under 35 U.S.C. 154(b) by 698 days.

(21) Appl. No.: 15/979,876

(22) Filed: May 15, 2018

(65) Prior Publication Data

US 2018/0327085 A1   Nov. 15, 2018

(30) Foreign Application Priority Data

May 15, 2017 (GB) ...................................... 1707773

(51) Int. Cl.
*G06F 30/15* (2020.01)
*G06F 30/20* (2020.01)
(Continued)

(52) U.S. Cl.
CPC ............ *B64C 25/60* (2013.01); *B60G 17/018* (2013.01); *B64D 45/00* (2013.01); *G06F 30/15* (2020.01);
(Continued)

(58) Field of Classification Search
CPC ... B64C 25/60; B64F 5/60; B64D 2045/0085; B64D 45/00; G06F 2111/10;
(Continued)

(56) References Cited

U.S. PATENT DOCUMENTS

2009/0287371 A1\* 11/2009 Wright ................... G06Q 10/06
701/33.4
2012/0053783 A1    3/2012 Nance
(Continued)

FOREIGN PATENT DOCUMENTS

CN         106096089         11/2016

OTHER PUBLICATIONS

R. Van der Valk, "The Use Of Monte Carlo Simulation In Determining Landing Gear Loads During Landing", 71st Meeting of the Agard Structures and Materials Panel. Portugal, Oct. 8-12, 1990, Jun. 1991, 12 pages.
(Continued)

*Primary Examiner* — Christian Chace
*Assistant Examiner* — Amelia Vorce
(74) *Attorney, Agent, or Firm* — Nixon & Vanderhye P.C.

(57) ABSTRACT

An apparatus for setting a dimension parameter relating to a value of a shock absorber dimension of an extension of a shock absorber of an aircraft landing gear. The apparatus includes a processor configured to identify a respective range of values relating to each of a plurality of operating characteristics under which the shock absorber may operate, and identify a respective probability distribution of values for each of the operating characteristics within the identified ranges. The processor is also configured to perform a generation process for generating a plurality of values of the shock absorber dimension by repeatedly selecting, as input into a computer-implemented model for determining a value of the shock absorber dimension, a value of each of the operating characteristics based on the respective probability distributions, and determining a given value of the shock absorber dimension using the selected values and the computer-implemented model.

20 Claims, 9 Drawing Sheets

(51) Int. Cl.
*B64D 45/00* (2006.01)
*G06F 111/08* (2020.01)
*B64C 25/60* (2006.01)
*B60G 17/018* (2006.01)
*B64F 5/60* (2017.01)

(52) U.S. Cl.
CPC .......... *G06F 30/20* (2020.01); *B60G 2400/25* (2013.01); *B64D 2045/0085* (2013.01); *G06F 2111/08* (2020.01)

(58) Field of Classification Search
CPC ...... G06F 2111/08; G06F 30/15; G06F 30/20; G01M 99/007; F16F 9/06; F16F 9/10; F16F 9/3228; F16F 9/3264; F16F 9/063; F16F 2230/0017; G07C 5/08; G07C 5/0816; G07C 5/0808; B60G 17/0185; B60G 17/015; B60G 17/018; B60G 2500/30; B60G 2400/25; B60G 2600/042; B60G 2600/044; B60G 2600/08; B60G 2300/16
See application file for complete search history.

(56) References Cited

U.S. PATENT DOCUMENTS

| | | | |
|---|---|---|---|
| 2015/0269794 A1 | 9/2015 | Fazeli et al. | |
| 2016/0101877 A1 | 4/2016 | Shepherd et al. | |
| 2018/0273162 A1* | 9/2018 | Fazeli | F16F 9/3292 |
| 2018/0293807 A1* | 10/2018 | Fazeli | G07C 5/006 |
| 2020/0248773 A1* | 8/2020 | Chandrashekar | A63G 31/02 |

OTHER PUBLICATIONS

Sartor et al., "Conceptual Design of a Hard Landing Indication System Using a Flight Parameter Sensor Simulation Model" 27th International Congress of the Aeronautical Sciences, ICAS 2010, 12 pages.

Sexstone, "Aircraft Structural Mass Property Prediction Using Conceptual-Level Structural Analysis" National Aeronautics and Space Administration, Hampton, Virginia, 1998, 15 pages.

* cited by examiner

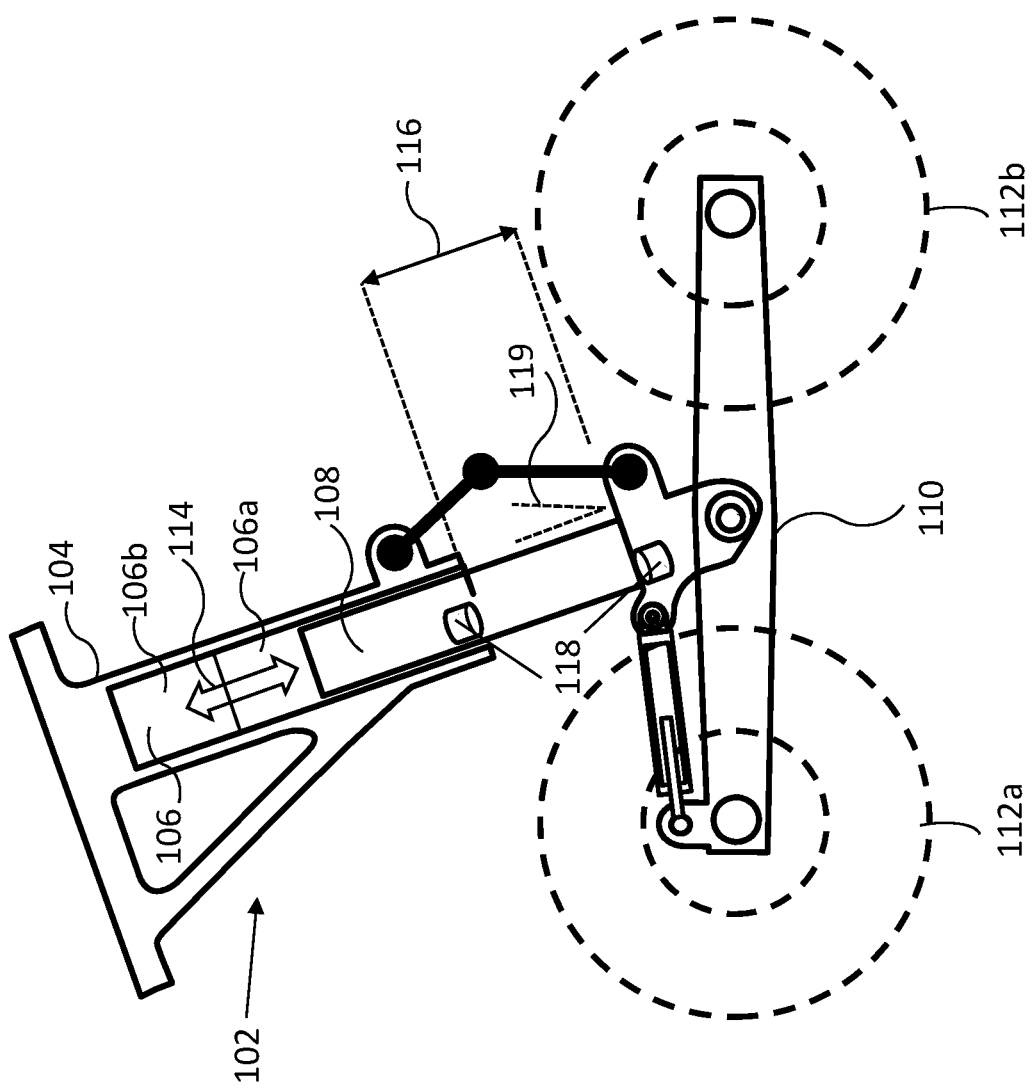

SHOCK ABSORBER DIMENSION

RELATED APPLICATION

This application claims priority United Kingdom Patent Application GB 1707773.6 filed May 15, 2017, the entirety of which is incorporated by reference.

TECHNICAL FIELD

The present invention relates to a method of setting a dimension parameter relating to a shock absorber of an aircraft landing gear.

BACKGROUND

The landing gears of an aircraft are normally inspected at an appropriate time when the aircraft is stationary on the ground between flights in order to check whether or not the landing gears require servicing. Specifically, a dimension of the shock absorber of the landing gear which is indicative of an extension of the shock absorber may be checked. The dimension of the shock absorber indicative of the extension of the shock absorber may be referred to as the H-dimension.

The H-dimension of a landing gear is inspected and compared against a minimum H-label. If the H-dimension of the landing gear shock absorber is measured to be above the minimum H-dimension shown on the H-label for the relevant set of conditions, this indicates that the landing gear does not require a service. If, on the other hand, the measured H-dimension is less than the minimum H-dimension shown on the H-label for the relevant conditions, this indicates that the landing gear may require a service.

Based on the result of the inspection of the landing gear, the engineer may ground the aircraft in order for the landing gear to be serviced.

An H-label for a landing gear may, for example, be generated and provided by the manufacturer of the landing gear.

SUMMARY

A first aspect of the present invention provides an apparatus for setting a dimension parameter relating to a value of a shock absorber dimension of a shock absorber of an aircraft landing gear, the shock absorber dimension being indicative of an extension of the shock absorber. The apparatus comprises a processor configured to: identify a respective range of values relating to each of a plurality of operating characteristics under which the shock absorber may operate; identify a respective probability distribution of values for each of the operating characteristics within the identified ranges; perform a generation process for generating a plurality of values of the shock absorber dimension by repeatedly: (i) selecting, as input into a computer-implemented model for determining a value of the shock absorber dimension, a value of each of the operating characteristics based on the respective probability distributions; and (ii) determining a given value of the shock absorber dimension using the selected values and the computer-implemented model; and set the dimension parameter based on the generated plurality of shock absorber dimension values.

Optionally, the computer-implemented model comprises a model of the variation of the shock absorber dimension with load on the shock absorber, the plurality of operating characteristics comprises an aircraft mass and a position of aircraft centre of gravity, and the generation process comprises using the computer-implemented model to determine the shock absorber load based on the selected aircraft mass and selected aircraft centre of gravity.

Optionally, the generation process comprises selecting values of aircraft mass and aircraft centre of gravity based on a predefined relationship between the aircraft mass and aircraft centre of gravity.

Optionally, the plurality of operating characteristics comprises a temperature, and the generation process comprises determining a first value of the shock absorber dimension based on the determined shock absorber load and the selected temperature.

Optionally, the plurality of operating characteristics comprises an amount of liquid loss from the shock absorber and the generation process comprises determining the given value of the shock absorber dimension on the basis of the selected value of the amount of liquid loss from the shock absorber and the determined first shock absorber dimension value.

Optionally, the plurality of operating characteristics comprises a gas absorption factor relating to an absorption of gas contained in the shock absorber into liquid contained in the shock absorber, and the generation process comprises: determining an internal pressure of the shock absorber and an internal temperature of the shock absorber based on the selected values of the operating characteristics; determining an amount of absorption of the gas into the liquid when the liquid is fully saturated in the liquid at the determined internal pressure and the determined internal temperature; modifying the determined amount of absorption on the basis of the gas absorption factor to determine a gas absorption amount; and determining the given value of the shock absorber dimension on the basis of the determined gas absorption amount and the determined first value of the shock absorber dimension.

Optionally, the processor is configured to: perform a first iteration of the generation process based on a first determined shock absorber load value, comprising determining a first value of the gas absorption amount; and perform a second iteration of the generation process based on a second determined shock absorber load value and the first value of the gas absorption amount, the second determined shock absorber load value being higher than the first determined shock absorber load value.

Optionally, the processor is configured to: compare the given value of the shock absorber dimension generated in the second iteration with a predetermined value indicating a limit of a range of movement of the shock absorber.

Optionally, the processor is configured to generate a probability distribution of shock absorber dimensions based on the generated plurality of shock absorber dimension values and set the dimension parameter on the basis of the generated probability distribution.

Optionally, the processor is configured to determine a probability of the shock absorber dimension having a value below a given value, and set said dimension parameter on the basis of the comparison.

Optionally, the dimension parameter comprises a minimum value of the shock absorber dimension.

Optionally, the processor is configured to set a plurality of minimum values for a respective plurality of sets of values of at least some of the operating characteristics.

A second aspect of the present invention provides a system for indicating a condition of a shock absorber fitted to an aircraft, the system comprising an apparatus according to the first aspect and further comprising: a computer readable storage medium having stored thereon the plurality of minimum values of the shock absorber dimension for the respective plurality of sets of values; a shock absorber dimension measuring device for acquiring a current value of the shock absorber dimension; one or more instruments for measuring current values of the at least some of the operating characteristics; and an indicating device for providing an indication that the measured current value of the shock absorber dimension is lower than the minimum value for a first set of values of the plurality of sets of values. The system is configured to identify the first set of the plurality of sets of values based on the measured current values of the at least some of the operating characteristics; and determine whether or not the measured shock absorber dimension is lower than the minimum value for the identified first set and, if so, cause the indicating device to provide the indication.

Optionally, the shock absorber dimension measuring device is one of: a potentiometer, an electro mechanical device, a laser device and an ultrasound device.

Optionally, the processor is configured to update one or more of the probability distributions using the measured current values of the set of the plurality of operating characteristics.

A third aspect of the present invention provides a method of setting a dimension parameter relating to a value of a shock absorber dimension of a shock absorber of an aircraft landing gear, the shock absorber dimension being indicative of an extension of the shock absorber. The method comprises identifying a respective range of values relating to each of a plurality of operating characteristics under which the shock absorber may operate; identifying a respective probability distribution of values for each of the operating characteristics within the identified ranges; performing a generation process for generating a plurality of values of the shock absorber dimension by repeatedly: (i) selecting, as input into a computer-implemented model for determining a value of the shock absorber dimension, a value of each of the operating characteristics based on the respective probability distributions; and (ii) determining a given value of the shock absorber dimension using the selected values and the computer-implemented model; and setting the dimension parameter based on the generated plurality of shock absorber dimension values.

Optionally, the computer-implemented model comprises a model of the variation of the shock absorber dimension with load on the shock absorber, the plurality of operating characteristics comprises an aircraft mass and a position of aircraft centre of gravity, and the generation process comprises using the computer-implemented model to determine the shock absorber load based on the selected aircraft mass and selected aircraft centre of gravity.

Optionally, the generation process comprises selecting values of aircraft mass and aircraft centre of gravity based on a predefined relationship between the aircraft mass and aircraft centre of gravity.

Optionally, the plurality of operating characteristics comprises a temperature, and the generation process comprises determining a first value of the shock absorber dimension based on the determined shock absorber load and the selected temperature.

Optionally, the plurality of operating characteristics comprises an amount of liquid loss from the shock absorber and the generation process comprises determining the given value of the shock absorber dimension on the basis of the selected value of the amount of liquid loss from the shock absorber and the determined first shock absorber dimension value.

Optionally, the plurality of operating characteristics comprises a gas absorption factor relating to an absorption of gas contained in the shock absorber into liquid contained in the shock absorber, and the generation process comprises: determining an internal pressure of the shock absorber and an internal temperature of the shock absorber based on the selected values of the operating characteristics; determining an amount of absorption of the gas into the liquid when the liquid is fully saturated in the liquid at the determined internal pressure and the determined internal temperature; modifying the determined amount of absorption on the basis of the gas absorption factor to determine a gas absorption amount; and determining the given value of the shock absorber dimension on the basis of the determined gas absorption amount and the determined first value of the shock absorber dimension.

Optionally, the method comprises performing a first iteration of the generation process based on a first determined shock absorber load value, comprising determining a first value of the gas absorption amount; and performing a second iteration of the generation process based on a second determined shock absorber load value and the first value of the gas absorption amount, the second determined shock absorber load value being higher than the first determined shock absorber load value.

Optionally, the method comprises comparing the given value of the shock absorber dimension generated in the second iteration with a predetermined value indicating a limit of a range of movement of the shock absorber.

Optionally, the method comprises generating a probability distribution of shock absorber dimensions based on the generated plurality of shock absorber dimension values and setting the dimension parameter on the basis of the generated probability distribution.

Optionally, the method comprises determining a probability of the shock absorber dimension having a value below a given value, and setting said dimension parameter on the basis of the comparison.

Optionally, the dimension parameter comprises a minimum value of the shock absorber dimension.

Optionally, the method comprises setting a plurality of minimum values for a respective plurality of sets of values of at least some of the operating characteristics.

Optionally, the method comprises measuring current values of the at least some of the operating characteristics for a shock absorber fitted to an aircraft; identifying a first set of the plurality of sets of values based on the identified current values; performing a measurement of the shock absorber dimension on the aircraft; and determining whether or not the measured shock absorber dimension is lower than the minimum value for the identified first set and, if so, providing an indication that the measured shock absorber is lower than the minimum value for the identified first set.

Optionally, the method comprises performing the measurement of the shock absorber dimension using at least one of: a potentiometer, an electro mechanical device, a laser device and an ultrasound device.

Optionally, the method comprises updating one or more of the probability distributions using the measured current values of the operating characteristics.

A fourth aspect of the present invention provides a computer program that, when executed by a processor causes the processor to perform a method according to the first aspect.

A fifth aspect of the present invention provides an apparatus for setting a minimum value of a shock absorber dimension of a shock absorber of an aircraft landing gear, the shock absorber dimension being indicative of an extension of the shock absorber. The apparatus comprises a processor configured to: identify a respective range of values relating to each of a plurality of operating characteristics under which the shock absorber may operate; identify a respective probability distribution of values for each of a plurality of operating characteristics under which the shock absorber may operate; perform a Monte Carlo simulation process to generate a plurality of values of the shock absorber dimension by iteratively: (i) selecting, as input into a computer-implemented model for determining a value of the shock absorber dimension, a value of each of the operating characteristics based on the respective probability distributions; and (ii) determining a given value of the shock absorber dimension using the selected values and the computer-implemented model; and set the minimum value based on the generated plurality of shock absorber dimension values.

BRIEF DESCRIPTION OF THE DRAWINGS

Embodiments of the invention will now be described, by way of example only, with reference to the accompanying drawings, in which:

FIG. 1b shows a schematic view of a landing gear of the aircraft of FIG. 1a;

DETAILED DESCRIPTION

Figure 1A:
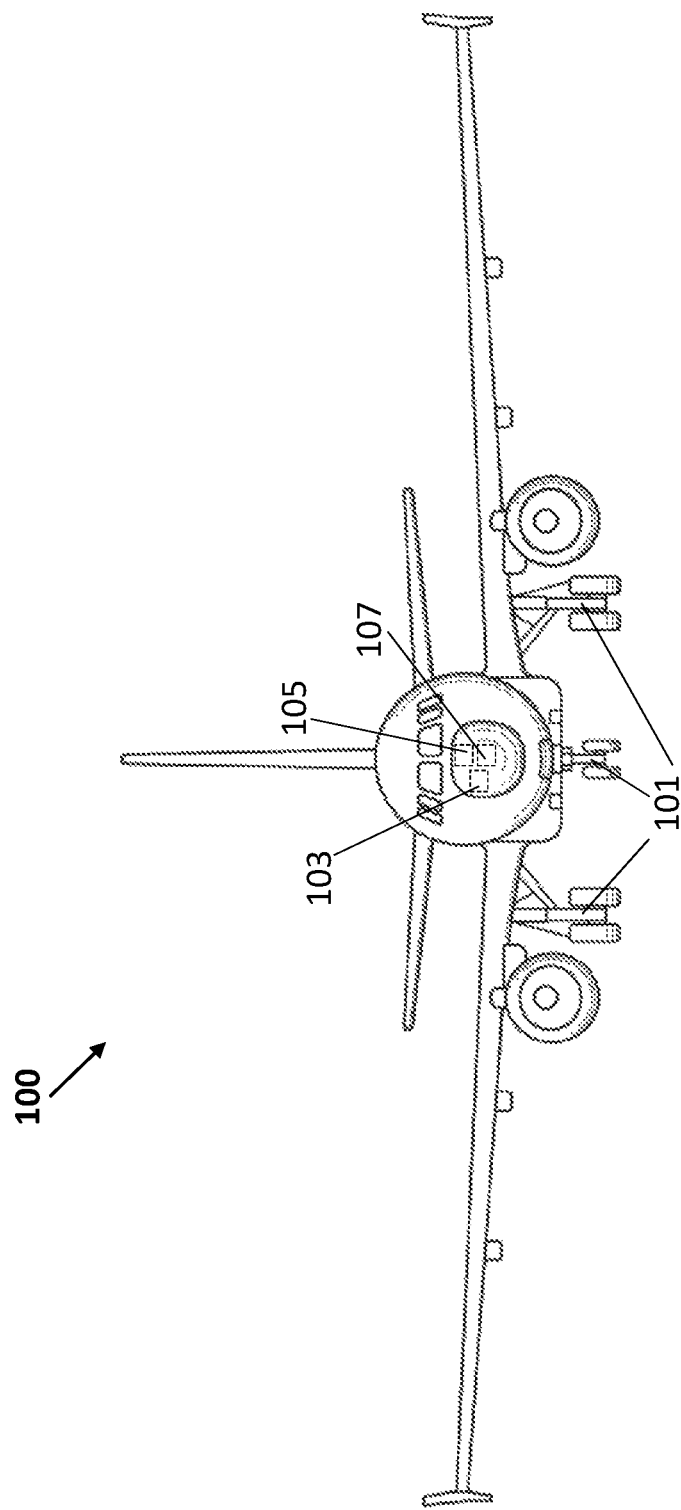
FIG. 1a shows a schematic view of an aircraft.

FIG. 1a is a simplified schematic view of an aircraft 100. The aircraft 100 comprises a plurality of landing gears 101. The landing gears 101 may include main and nose landing gears that may be extended during take-off and landing. The aircraft 100 also comprises a computing system 103 and instruments 105, such as measuring instruments for measuring environmental or other conditions, such as temperature. The computing system 103 may, for example, comprise one or more processors and one or more computer readable storage media. The aircraft 100 may also comprise indicating devices 107 for providing various indications relating to the aircraft 100 and operating characteristics.

FIG. 1b is a simplified schematic view of an aircraft nose landing gear 101 in a configuration when the aircraft is stationary on the ground. Although the following description is with respect to the nose landing gear 101, the present invention may equally be applied to other types of landing gear, such as main landing gear, for example. The landing gear may comprise a main fitting 102 which attaches the landing gear 101 to the body of the aircraft 100. The landing gear 101 comprises a shock absorber 102. The landing gear 101 may be configured to retract into the body of the aircraft 101 when the landing gear 101 does not need to be extended. The shock absorber 102 comprises a main fitting 104. A connecting structure 110 connects the shock absorber 102 to wheels 112a, 112b that contact the ground when the aircraft is on the ground.

In the example of FIG. 1b, the shock absorber 102 comprises a chamber 106 which may contain a liquid 106a and a gas 106b in fluid communication with each other. The liquid 106a contained in the chamber 106 may, for example, be oil, and the gas 106b contained in the chamber 106 may, for example, be an inert gas such as Nitrogen gas ($N_2$). Any liquid and gas suitable for use within a shock absorber of an aircraft landing gear may be used. The shock absorber 102 also comprises a slider 108 which may also be referred to as piston 108. The piston 108 translates into the main fitting 104 as shown by arrow 114 against the pressure of the gas 106b and liquid 106a in the chamber 106.

In the example of FIG. 1b, a part of the piston 108 with a dimension indicated by arrow 116 extends downwards from the main fitting 104 to the connecting structure 110. The shock absorber 102 may comprise a shock absorber dimension measuring device 118 for performing measurements of the shock absorber dimension 116. This dimension, which is herein referred to as the "H-dimension" is indicative of an extension of the shock absorber as it varies according to the degree of extension. The H-dimension may indicate an amount of remaining travel of the shock absorber e.g. the length of the piston 108 available to slide into the main fitting 104. Different definitions of the H-dimension may be used, depending on the manufacturer for example; in other words the points between which a measurement of the H-dimension is to be taken may vary. For example, a manufacturer of a landing gear may provide markers on certain components of the shock absorber between which a measurement of the H-dimension is to be taken.

Figure 2:
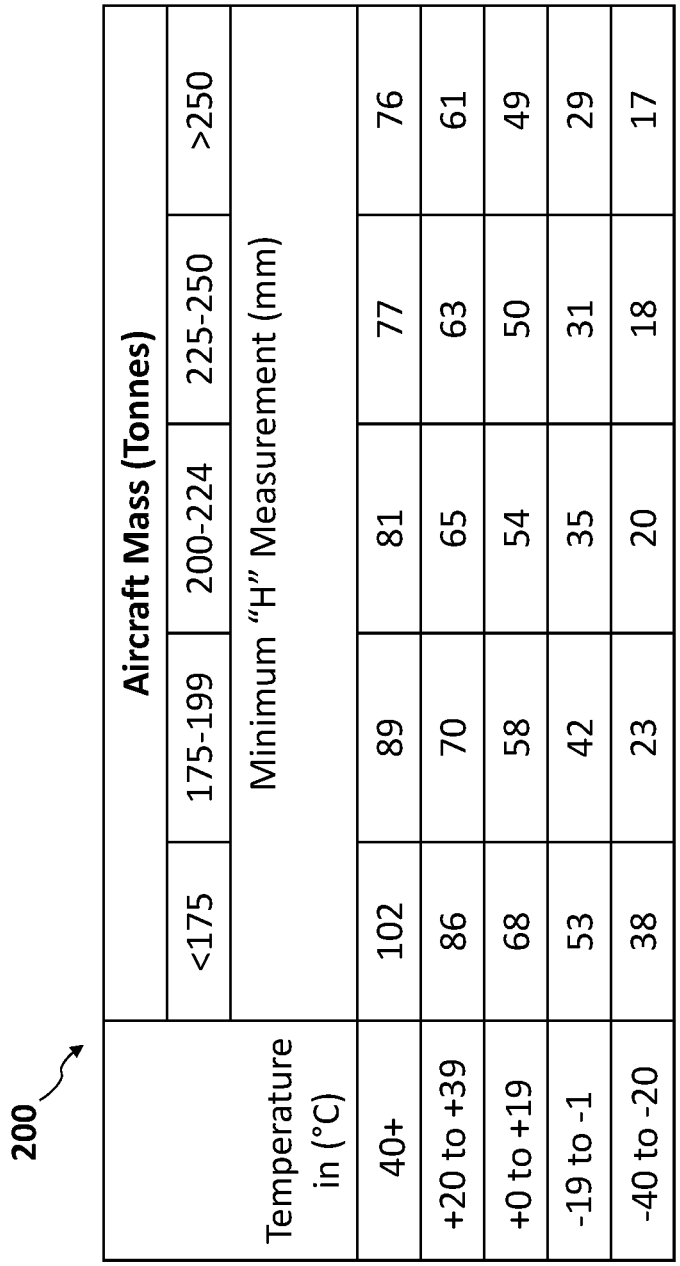
FIG. 2 shows an example of a label indicating dimension parameters of a shock absorber dimension.

FIG. 2 shows an example of a label 200 which indicates dimension parameters relating to a value of a shock absorber dimension. The dimension parameters indicated in the label 200 are to be compared with measured parameters of the shock absorber 102 in order to determine whether or not the landing gear 101 requires servicing. In the example of FIG. 2, the dimension parameters are minimum values of a shock absorber dimension. Specifically, in this example, the dimension parameters are minimum shock absorber H-dimension 116 values. The label 200 is thus an example of a minimum H-label. The minimum H-label 200 shown is a table in which each column represents a range of aircraft masses and each row represents a range of ambient temperatures. The aircraft mass and the ambient temperature are examples of operating characteristics under which the shock absorber 101 may operate. For each combination of range of aircraft masses and range of ambient temperatures, the minimum H-label 200 indicates a minimum H-dimension value in units of length. The H-dimension 116 of the landing gear 101 may be measured during an inspection of the landing gear 101 and compared with the relevant value provided in the minimum H-label 200. For example, for an ambient temperature greater than 40° C. and an aircraft weighing less than 175 tonnes in mass, the minimum H-dimension measurement is indicated as 102 mm in the minimum H-label 200. If the measured H-dimension 116 for these operating characteristics is a value greater than 102 mm, it may be determined that the landing gear 101 does not require a service. On the other hand, if the measured H-dimension 116 for these operating characteristics is less than 102 mm, it may be determined that the landing gear 101 requires a service.

If the landing gear 101 is determined to require a service, the aircraft 100 to which landing gear 101 belongs may be "grounded" until a service on the landing gear 101 can be performed. Here, the term "grounded" means that the aircraft in question is not permitted to fly, for example, while carrying passengers. In some examples, the aircraft 100 may be sent to an appropriate facility for its landing gear 101 to be serviced.

In order to generate a minimum H-label such as the one shown in FIG. 2, the manufacturer of the landing gear 101 conventionally performs a deterministic calculation using values of various operating characteristics for which the landing gear 101 does not require a service, and which would yield the smallest values of the H-dimension. Thus, the minimum H-dimensions for which the landing gear 101 does not require a service for certain operating characteristics such as various aircraft mass ranges and ambient temperature ranges may be calculated and a minimum H-label such as in FIG. 2 is provided.

Figure 3:
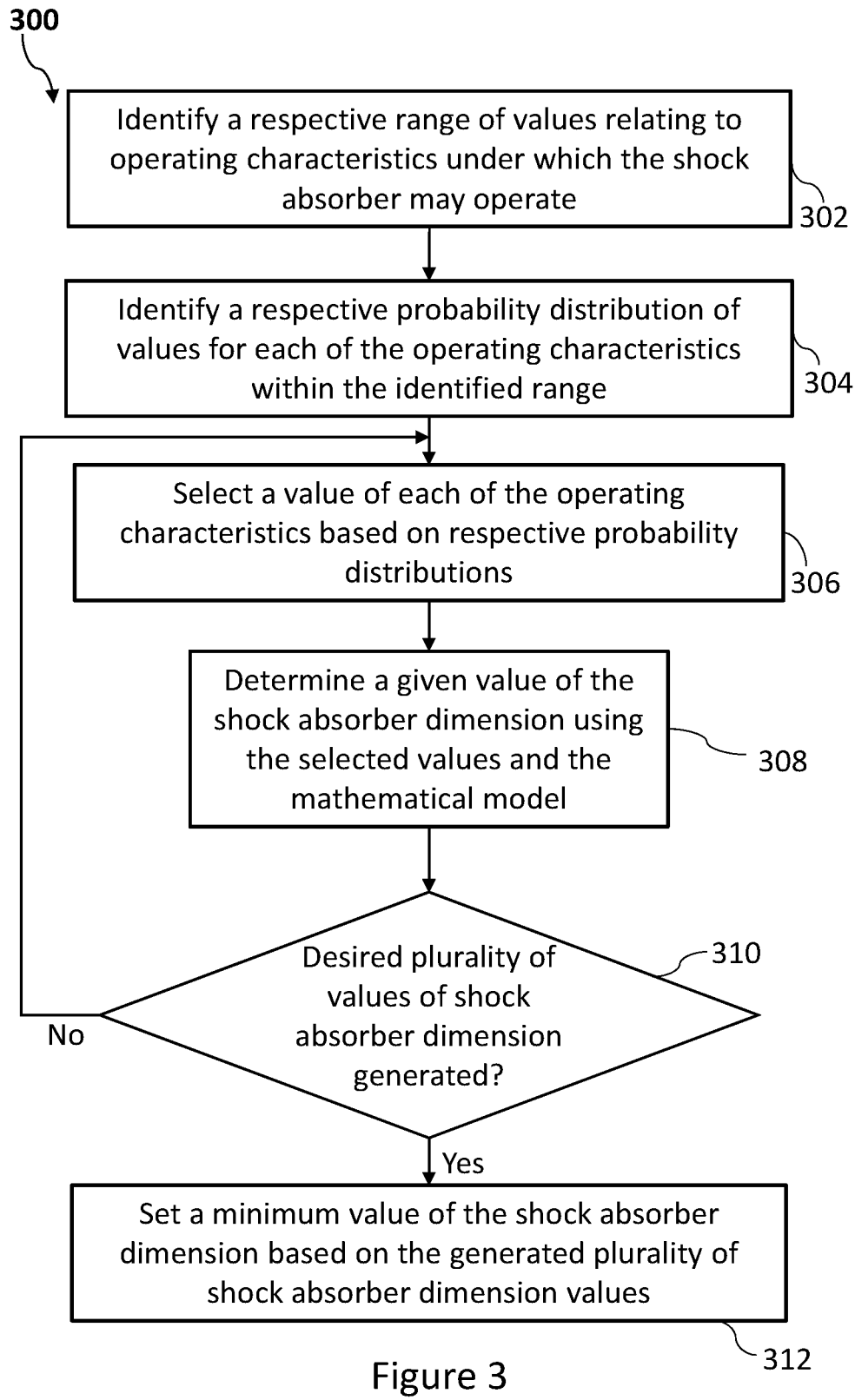
FIG. 3 is a flow diagram of a method of setting a dimension parameter of a shock absorber dimension.

FIG. 3 summarizes the steps of an iterative method 300, according to an embodiment of the present invention, of setting a dimension parameter relating to a minimum value of a shock absorber dimension of a shock absorber of an aircraft landing gear, the dimension being indicative of an extension of the shock absorber 102. For example, method 300 relates to setting the minimum value of the H-dimension of the shock absorber 102 such that a measured H-dimension value 116 being below the set minimum value indicates that the landing gear 101 requires servicing, whereas a measured H-dimension value 116 being above the minimum set using method 300 indicates that the landing gear 101 does not require servicing. Thus, the method 300 may be used to generate a minimum H-label such as the one shown in FIG. 2.

The method 300 comprises performing a generation process for generating a plurality of values of the shock absorber dimension, such as the H-dimension 116, and setting a minimum value of the H-dimension based on the generated plurality of H-dimension values.

Step 302 of the method 300 involves identifying a respective range of values relating to each of a plurality of operating characteristics under which the shock absorber 102 may operate. For example, the plurality of operating characteristics may comprise the aircraft mass, the position of aircraft centre of gravity, the ambient temperature, an amount of oil loss from the shock absorber 102 and/or a gas absorption factor relating to an absorption of gas 106b contained in the shock absorber 102 into oil 106a contained in the shock absorber 102. It will be understood from the above description that the oil 106a and gas 106b contained in the shock absorber 102 are contained in the chamber 106 in the example of the shock absorber 102 shown in FIG. 1.

Some of the operating characteristics, such as, for example, the amount of oil loss from the shock absorber 102 and the gas absorption factor of gas 106b in the chamber 106 indicate a condition of the landing gear 101. Other operating characteristics, such as, for example, the mass of the aircraft 100 may be those that relate to conditions under which the landing gear 101 is expected to function.

The respective ranges of values for the operating characteristics relating to conditions under which the landing gear 101 is expected to function may be based on data collected regarding conditions under which an aircraft is used, for example. For example, the range of values for aircraft mass may be identified to be a range of aircraft masses taking into account the number of passengers, the amount of luggage, the amount of fuel, etc., the aircraft 100 is expected to function with. The respective ranges of values are such that each range of values corresponds to an expected range of values.

The respective ranges of values for the operating characteristics that indicate a condition of the landing gear 101 may be ranges for which the shock absorber 102 is expected to function normally. In other words, each respective range of values indicating a condition of the landing gear 101 may be such that the landing gear 101 is not expected to require a service. For example, the range of values of oil loss from the chamber 106 may be such that the landing gear 101 may not require a service. For example, respective ranges of values of operating characteristics indicating a condition of the landing gear 101 may be identified as ranges centred around nominal values of operating characteristics. For example, the range of values of oil loss may be identified on the basis of a suitable range of amount of oil 106a in the shock absorber 102 with which the shock absorber 102 is expected to function normally, centred on the nominal/recommended amount of oil 106a in the shock absorber 102. For operating characteristics such as the gas absorption factor, the range of values may be identified on the basis of an amount of time the landing gear 101 is to be under a certain load, corresponding to a certain gas pressure in chamber 106, for example. Such an amount of time may be relevant for the gas absorption factor because the gas 106b in chamber 106 may be expected to absorb into the oil 106a in the chamber 106 at a certain rate given the gas pressure in chamber 106. In order to set a minimum H-dimension 116, the ranges may be selected around worst-case conditions, such as maximum oil loss, maximum gas absorption, lowest temperature and most adverse conditions of mass and centre of gravity, in order to focus on the conditions most likely to produce a low H-dimension 116.

At step 304 of the method 300, a respective probability distribution of values for each of the operating characteristics within the identified range is identified. For example, a probability distribution of aircraft mass, position of aircraft centre of gravity, ambient temperature, oil loss from the shock absorber and/or gas absorption factor may be identified.

Figure 4:
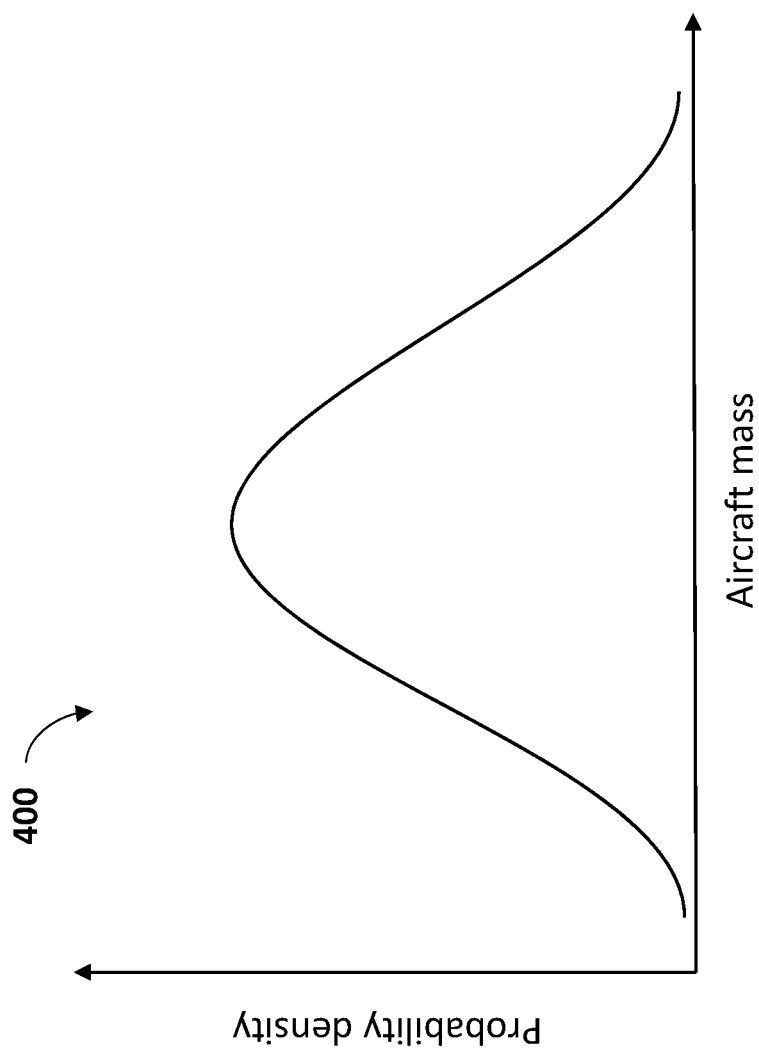
FIG. 4 shows a probability distribution of an operating characteristic relating to an aircraft.

One example of a probability distribution that may identified is shown in FIG. 4. The graph 400 of FIG. 4 shows probability density as a function of aircraft mass.

At step 306 of the method 300, a value of each of the operating characteristics is selected based on the respective probability distributions. The values of each of the operating characteristics are selected as input into a computer-implemented model for determining a value of the H-dimension of the shock absorber 102. The computer-implemented model may, for example, be a mathematical model. Further details of the computer-implemented model for determining the H-dimension 116 are described further below.

At step 308, a given value of the shock absorber H-dimension 116 is determined using the selected values and the computer-implemented model.

At step 310, it is checked whether or not a desired number of values of the shock absorber H-dimension have been generated. In other words, at step 310, it is checked whether or not a specified number of iterations of steps 306 to 308 has been performed. If the specified number of iteration has not been performed, and thus, the desired number of values of the shock absorber H-dimension 116 have not been generated, the process proceeds to step 306, and steps 306 to 310 are repeated. This generation process thus generates the desired plurality of values of the shock absorber H-dimension 116. Thus, a generation process is performed for generating a plurality of values of the shock absorber H-dimension by repeatedly performing steps 306 to 308 of the method 300. The method 300 may be considered to comprise a Monte Carlo (MC) simulation.

The specified number of iterations may be specified by the user of the method 300, for example, when the user initiates the method. The number of iterations may be selected based on an amount of computing resources available to perform the method, for example.

At step 312, a minimum value of the shock absorber H-dimension 116 is set based on the generated plurality of shock absorber H-dimension 116 values. A different minimum value of the H-dimension 116 may be selected for given ranges of aircraft mass and ambient temperature in order to generate a minimum H-label such as the one shown in FIG. 2, for example. In one example, for each combination of aircraft mass and ambient temperature shown in minimum H-label 200, the smallest H-dimension value generated during the generation process for that combination of aircraft mass and ambient temperature ranges may be set as the minimum value of the H-dimension 116. In one example, the ranges of values identified for the operating characteristics that indicate a condition of the landing gear 101 may be such that servicing of the landing gear 101 is not expected to be required. Thus, a plurality of minimum values of the shock absorber H-dimension 116 for a respective plurality of sets of values of at least some of the operating characteristics may be set.

The plurality of operating characteristics for which respective ranges of values are identified in step 302 of the method 300 may comprise some or all of the operating characteristics accounted for in the computer-implemented model. The computer-implemented model may account for at least the following operating characteristics: aircraft mass, the position of aircraft centre of gravity, the ambient temperature, an amount of oil loss from the shock absorber 102 and a gas absorption factor relating to an absorption of gas 106b contained in the shock absorber 102 into oil 106a contained in the shock absorber 102. In some examples, at step 302, a range of values for all of the operating characteristics accounted for in the computer-implemented model may be identified. In other examples, however, the value of some operating characteristics may be fixed to a specific value as input into the computer-implemented method. For example, the amount of oil loss and the gas absorption factor may be fixed.

Further details of the computer-implemented model mentioned above will now be described with reference to FIG. 5, and for an example in which respective ranges of values for all operating characteristics accounted for in the computer-implemented model are identified at step 302. In this example, the computer-implemented model accounts for aircraft mass, the position of aircraft centre of gravity, the ambient temperature, an amount of oil loss from the shock absorber 102 and a gas absorption factor relating to an absorption of gas 106b contained in the shock absorber 102 into oil 106a contained in the shock absorber 102.

Figure 5:
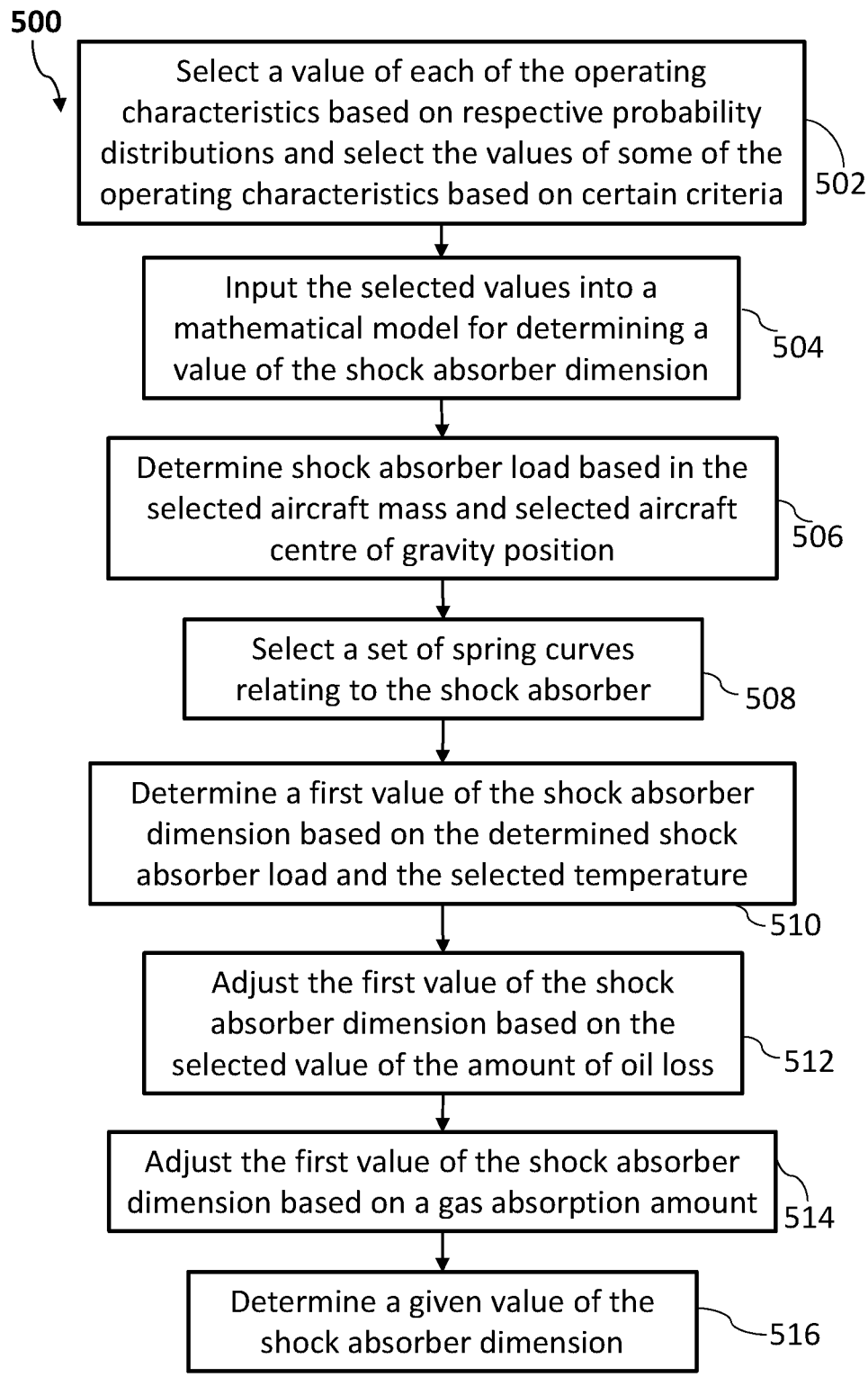
FIG. 5 is a flow diagram showing a method of determining a shock absorber dimension.

FIG. 5 is a flow diagram of a method 500 showing steps that may be performed as part of steps 306 to 308 of the method 300. Step 502 of the method 500 is a specific example of step 306 of the method 300. At step 502, the values of some of the operating characteristics may be selected based on certain criteria. For example, the values of aircraft mass and aircraft centre of gravity may be selected based on a predefined relationship between the aircraft mass and aircraft centre of gravity position. The predefined relationship may limit the combinations of aircraft mass and aircraft centre of gravity position such that a realistic aircraft mass and aircraft centre of gravity position combination is selected. A realistic aircraft mass and aircraft centre of gravity position combination may be one for which the aircraft centre of gravity position is not such that for the selected aircraft mass the aircraft 100 would not be stable when on the ground, for example. For example, a combination for which an aircraft centre of gravity position towards the tail of the aircraft 100 resulting in a risk of the aircraft 100 tipping backwards for the selected aircraft mass would be excluded based on the predefined relationship. In one example, the predefined relationship may also limit the combination of aircraft mass and aircraft centre of gravity values to those combinations that are within a "take-off envelope". The take-off envelope may define the combinations of aircraft mass and aircraft centre of gravity values expected before take-off.

At step 504 of the method 500, the selected values of the operating characteristics are input into the computer-implemented model for determining a value of the shock absorber H-dimension 116. The computer-implemented model may, for example, comprise determining a shock absorber load and determine the shock absorber H-dimension 116 based on the determined load. The computer-implemented model may also account for the oil loss from the shock absorber and the gas absorption factor.

During the generation process, the computer-implemented model is used to determine the load on the shock absorber 102 based on the selected values of the aircraft mass and aircraft centre of gravity position at step 506. More specifically, at step 506, a static balance calculation using the selected aircraft mass and selected aircraft centre of gravity is performed to determine a ground reaction load on the landing gear 101. The ground reaction load may be defined as the load on the landing gear 101 due to the reaction force from the ground responsive to the weight of the aircraft 100 supported by the landing gear 101. This ground reaction load is resolved into the axis of the shock absorber 102 based on the rake angle 119 of the shock absorber 102 shown in FIG. 1.

Figure 6:
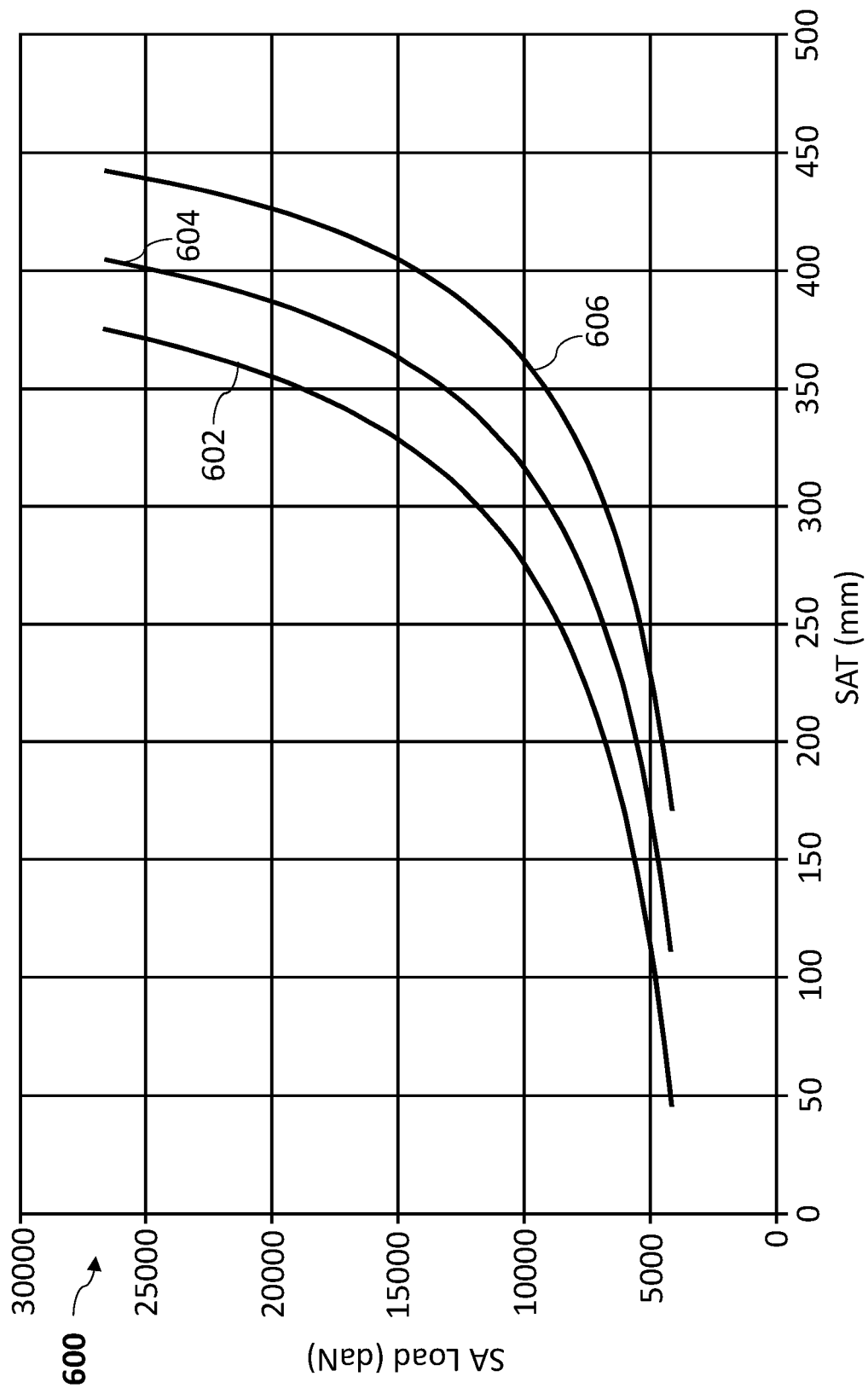
FIG. 6 shows graphs indicating relationships between a load and a travel of a shock absorber.

The computer-implemented model comprises a model of the variation of the shock absorber H-dimension 116 (hereinafter, the spring curve model) with load on the shock absorber 102. At step 508 a set of spring curves relating to the shock absorber 102 from the spring curve model is selected. An example of a set of spring curves 600 is shown in FIG. 6. The spring curves 600 of FIG. 6 show a relationship between the shock absorber load "SA Load" in units of decanewtons (daN) and the shock absorber travel "SAT" in mm for various temperatures. In the example of FIG. 6, the spring curve 602 shows the load vs SAT relationship for a temperature of 30° C., the spring curve 604 shows the load vs SAT relationship for a temperature of 0° C., and the spring curve 606 shows the load vs SAT relationship for a temperature of −30° C. A set of spring curves may comprise more or fewer spring curves than are shown in FIG. 6 for various temperatures.

Referring again to FIG. 5, at step 510, a specific spring curve from the set of selected spring curves is selected based on the ambient temperature selected in step 306. Using the selected spring curve, and based on the determined load on the shock absorber, a first value of the shock absorber H-dimension 116 is determined. Thus at step 406, the first value of the shock absorber H-dimension 116 is determined based on the determined shock absorber load and the selected temperature.

At step 512, the first value of the shock absorber H-dimension 116 is adjusted on the basis of the selected value of the amount of oil loss from the shock absorber.

Figure 7:
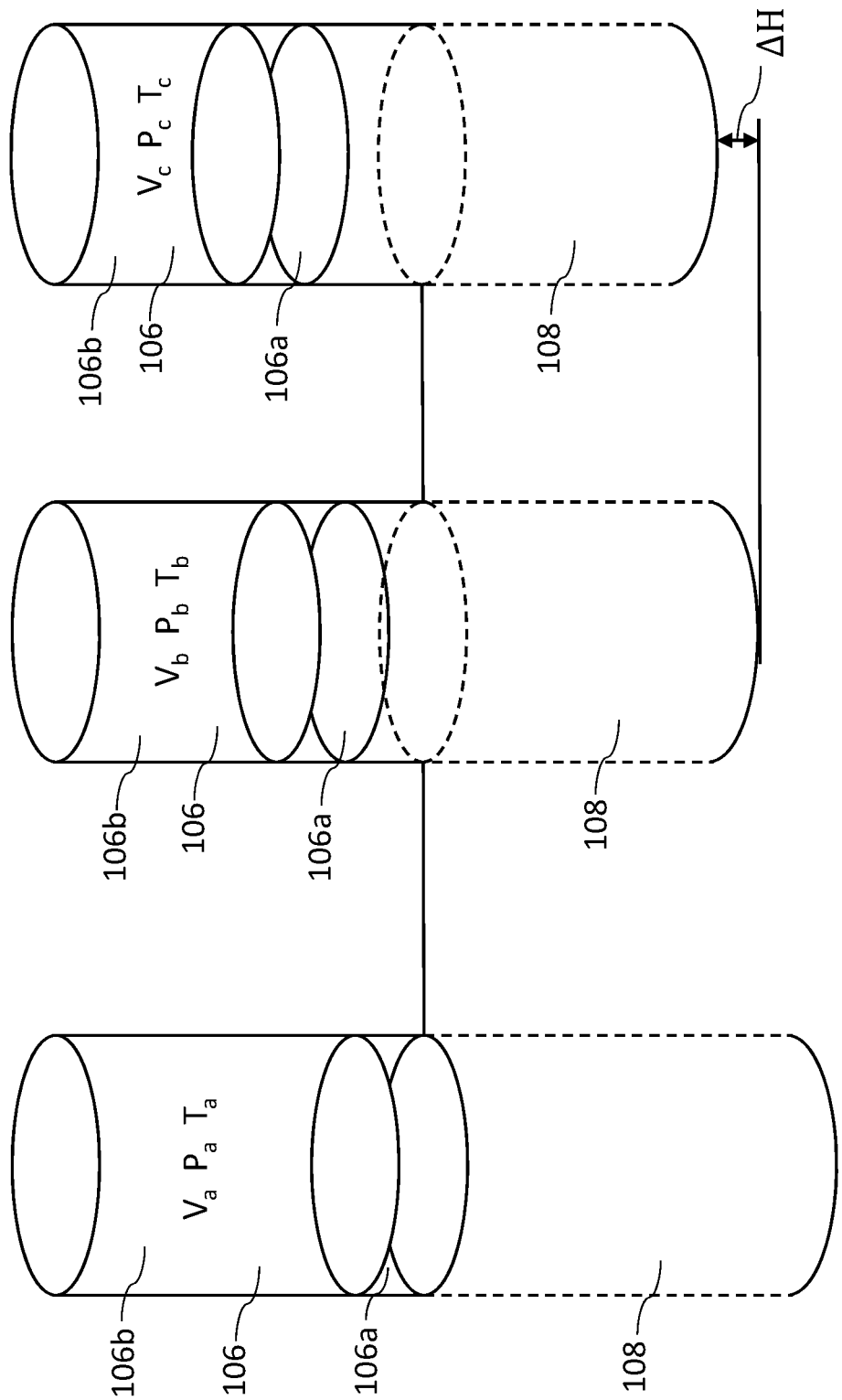
FIGS. 7a to 7c are schematic views showing different extensions of a shock absorber.

At step 514, the first value of the shock absorber H-dimension 116 is also adjusted based on a gas absorption amount. Further details of step 514 will now be described with reference to FIG. 7a-c. FIG. 7a illustrates parts of the shock absorber 102 when the shock absorber 102 is fully extended, in other words, when the piston 108 is at its maximum extension out of the main fitting 104 (not shown). FIG. 7a-c show oil 106a and gas 106b in the chamber 106.

In FIG. 7a, $V_a$, $P_a$, $T_a$ are the volume of gas 106b, charge pressure and charge temperature respectively when the shock absorber 102 is fully extended. Using experimental relationships, obtained from experiments to determine relationships between gas pressure within shock absorbers of aircraft landing gears and the amount of gas 106b absorbed into the oil 106a, an amount $X_a$ of gas 106b saturating the oil 106a, which may, for example, be in units of moles of gas 106b absorbed per litre of oil 106a, at pressure $P_a$ is determined, and from this the number of moles of calculated using Equation 1 below:

$$n_{oil\ a} = X_a \times \text{volume of oil } 602 \quad (1)$$

In the above Equation 1, $n_{oil\ a}$ is the number of moles of gas 106b absorbed into oil 106a at saturation, at pressure $P_a$ and at temperature $T_a$. Step 514, in this example, comprises determining an internal pressure of the shock absorber 102 and an internal temperature of the shock absorber 102 based on the selected values of the operating characteristics. For example, the internal pressure and temperature may be determined based on the selected ambient temperature and the determined shock absorber load. The amount of extension of the shock absorber 102 when the determined shock absorber load is applied, and having regard to the selected amount of oil loss, is shown in FIG. 7b. The internal volume of gas 106b in the shock absorber 102 when the determined shock absorber load is applied may be determined on the basis of the change in shock absorber extension from fully extended as in FIG. 7a to the amount of extension when the determined shock absorber load is applied as shown in FIG. 7b. As a result of the determined shock absorber load, the gas 106b is determined to have determined volume $V_b$, determined internal pressure $P_b$ and determined internal temperature $T_b$ in this example, the pressure $P_b$ being dependent on the load. However, due to the increase in pressure from $P_a$ to $P_b$, the number of moles of gas 106b absorbed into the oil may increase. FIG. 7b shows the situation without the increase in absorption of gas 106b into the oil 106a being taken into account.

Step 514 also comprises determining an amount of absorption of the gas 106b into the oil 106a when the gas 106b is fully saturated in the oil 106a. Using the experimental relationships acquired by the applicant mentioned above, an amount $X_b$ of gas 106b absorbed into the oil 106a at saturation, at pressure $P_b$ and at temperature $T_b$ is then determined. This saturation amount of absorption at pressure $P_b$ and at temperature $T_b$ is then modified on the basis of the selected gas absorption factor to determine a gas absorption amount using Equation 2 below:

$$n_{oil\ c} = \text{selected gas absorption factor} \times X_b \times \text{volume of oil } 602 \quad (2)$$

In Equation 2 above, $n_{oil\ c}$ is the determined gas absorption amount. Subsequently, the change in the shock absorber H-dimension 116 due to the change in gas absorption amount ($n_{oil\ c} - n_{oil\ a}$) is determined using Equation 3 below:

$$\Delta H = \frac{RT_b}{P_b A} \times (n_{oil\ c} - n_{oil\ a}) \quad (3)$$

In Equation 3 above, A represents the surface area of the piston 108 in contact with the oil 106a, and R represents the ideal gas constant. The change $\Delta H$ in the shock absorber H-dimension 116 is illustrated in FIG. 7c. The change $\Delta H$ in the shock absorber H-dimension 116 is used to adjust the H-dimension 116 calculated in steps previous to step 514. Thus, at step 516, the given value of the shock absorber H-dimension 116 is determined on the basis of the determined gas absorption amount $n_{oil\ c}$ and an adjusted first value of the shock absorber H-dimension 116 from step 512, in this example.

In some examples, the adjusted value determined in step 512 taking account of oil loss is determined to be the given amount of the shock absorber H-dimension 116 at step 516 and step 514 is excluded. Thus, in some examples, the given value of the shock absorber H-dimension 116 is determined on the basis of the selected value of the amount of oil loss from the shock absorber 102 and the determined first value of the shock absorber H-dimension 116. In other examples, the method 500 proceeds to step 514 before the given value of the shock absorber H-dimension 116 is determined at step 516.

In some examples, as described above with reference to FIGS. 5-7, the adjusted value from step 408 is further adjusted based on the gas absorption amount to determine the given value of the shock absorber H-dimension at step 516. In these examples, the given value of the shock absorber H-dimension 116 is determined based on the gas absorption amount, the selected oil loss amount and the determined first value of the shock absorber H-dimension 116. In some examples, however, step 512 is excluded, and the first value of the shock absorber H-dimension 116 is adjusted based on the gas absorption amount. More specifically, in such examples, the given value of the shock absorber H-dimension 116 is determined on the basis of the gas absorption amount and the determined first value of the shock absorber H-dimension 116.

Referring again to FIG. 3, it will be understood that step 312 of the method 300 of setting a minimum value of the shock absorber H-dimension 116 may be performed after the method 500 is performed. As described above, at step 312, a plurality of minimum values of the shock absorber H-dimension 116 for a respective plurality of sets of values of at least some of the operating characteristics may be set. In one example, when the ranges of values identified for the operating characteristics that indicate a condition of the landing gear 101 may be such that servicing of the landing gear 101 is not expected to be required, for each combination of aircraft mass and ambient temperature shown in minimum H-label 200, the smallest H-dimension value generated during the generation process for that combination of aircraft mass and ambient temperature ranges may be set as the minimum value of the H-dimension 116.

In some examples, based on the plurality of values of shock absorber H-dimension 116 generated in the generation process described above, a probability distribution of shock absorber H-dimensions 116 may be generated. The minimum value of the shock absorber H-dimension 116 may be set on the basis of the generated probability distribution of H-dimensions. For example, the probability distribution of H-dimensions may indicate the probability of various H-dimension values occurring when the shock absorber 102 is expected to be functioning normally, in other words, the respective range of values of operating characteristics used to generate the probability distribution of H-dimensions are such that the shock absorber 102 is expected to be functioning normally. The minimum H-dimension values may be set on the basis of a probability threshold using the generated probability distribution of H-dimensions. For example, a minimum H-dimension value may be set to be greater than the smallest H-dimension values that have a probability of occurring smaller than the probability threshold when the shock absorber 102 is functioning normally.

In other examples, other criteria may be used in order to set minimum values of the shock absorber H-dimension 116. In one example, a "taxi over bump" criteria may be used. In this example, a MC simulation described with reference to FIGS. 3 and 5 above is performed based on a load on the shock absorber increased by 20%, or another suitable value that simulates the shock absorber load when the wheels 112a, 112b roll over a bump or other topological feature. A modified shock absorber H-dimension value is then generated, and a determination made as to whether or not this modified shock absorber H-dimension value represents a "bottoming" of the shock absorber 102 (i.e. the shock absorber 102 exhausting its range of travel). This determination may comprise comparing the determined modified H-dimension value with a "bottoming" value, i.e. a predetermined value indicating a limit of a range of movement of the shock absorber 102 (i.e. its range of travel). The bottoming value depends on factors including the geometry of the shock absorber 102, and the amount of liquid in the shock absorber 102.

The MC simulation in this case may be performed additional to the process described above with reference to FIGS. 3 and 5. That is, for each iteration of steps 306 to 308 performed using a given shock absorber load value, a corresponding iteration using an increased load (e.g. increased by 20%) is performed. In the latter case however, it should be noted that the amount of gas absorption used in the computer-implemented model is set to the same value as for the former case, rather than recalculated using the increased load value. This is to take account of the fact that the increased load that is simulated results is momentary (resulting from a sudden shock such as the aircraft 100 riding over a bump), and that the amount of gas absorbed as a result of any increase in pressure during the period of increased load is therefore not expected to be significant.

As a result it is possible to determine, firstly, a probability (referred to below as a "first probability") for a given H-dimension value, that a normally functioning shock absorber 102 would have a H-dimension value below the given H-dimension and, secondly, a probability (a "second probability") that the normally functioning shock absorber 102 having the given H-value will "bottom" i.e. exhaust its range of travel. Generally, the first probability increases, and the second probability decreases, the higher the given H-dimension value. Since a low value of both the first probability (so as to avoid unnecessarily grounding aircraft) and the second probability (so as to avoid bottoming occurring) is generally desired, a value may be selected to set as the minimum H-value which balances these two competing requirements. For example, a minimum H-value may be set which produces a value of $10^{-6}$ or lower for both the first probability and the second probability.

The probability distribution of H-dimensions may be used to evaluate values specified in a manufacturer provided minimum H-label, for example. For example, the probability of the shock absorber H-dimension 116 having a value below a given minimum H-dimension from a manufacturer minimum H-label may be determined, and the minimum value of the shock absorber H-dimension 116 may be set based on this comparison.

The comparison of probability distributions of H-dimensions generated using the above described methods with manufacturer provided minimum H-labels, and modification of those minimum H-labels by setting new minimum H-dimension values as described above may be advantageous if the manufacturer minimum H-label values are too conservative. For example, in some cases, a manufacturer minimum H-label may indicate a certain minimum value, and it may be the case that the landing gear 101 in fact does not require a service when the H-dimension 116 is below that certain minimum value. In such an example, the aircraft 100 may be grounded when in fact it is not necessary for it to be grounded. Modifying a minimum H-label as described above may thus avoid unnecessary grounding of the aircraft 100.

In some examples, where the probability distribution of H-dimensions is generated for operating characteristics for which a landing gear service is not expected to be required, if there is a non-zero probability of the shock absorber H-dimension 116 being lower than the certain minimum value on the manufacturer minimum H-label, an updated minimum H-label may be generated in which the minimum value in question is lowered depending on acceptable tolerances of probability.

As described above, for a respective plurality of sets of values of at least some of the operating characteristics, such as, for example, those sets of values shown in minimum H-label 200, a respective plurality of minimum values of H-dimension 116 may be set. In other words, a minimum H-label such as the minimum H-label 200 may be generated using the above described methods.

Figure 8:
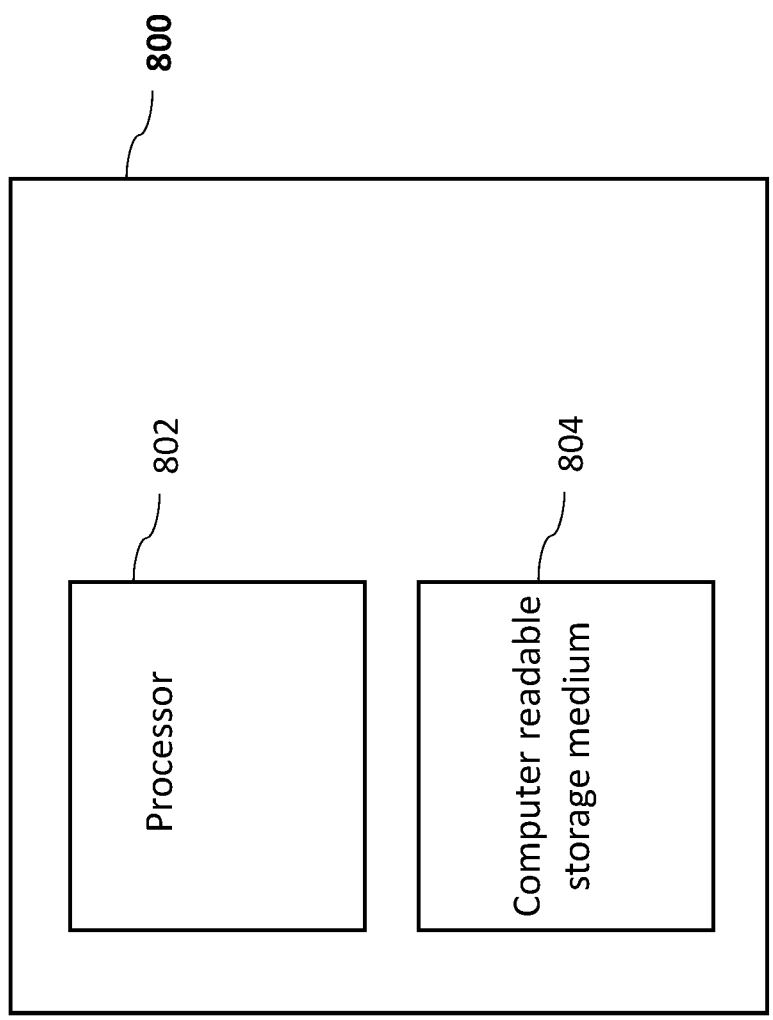
FIG. 8 illustrates an example of a computing apparatus.

The above described methods and MC simulations may be performed using computing apparatus such as computing apparatus 800 shown in FIG. 8, for example. Computing apparatus 800 may comprise a processor 802 and a computer readable storage medium 804. The processor 802 may be configured to execute instructions stored on the storage medium 804. The storage medium 804 may store instructions for performing all or part of any of the above described methods and MC simulations. In some examples, computing apparatus 800 for performing the above described methods may be included in the computing system 103 of the aircraft 100. In other examples, the computing apparatus 800 may be an external device.

All or part of the instructions for performing the above described methods and simulations may be generated and/or performed using any suitable software or combination of software. In one example, "MATLAB" may be used to generate all or part of the instructions for a processor such as processor 802 to carry out any of the above methods and simulations, and/or to perform all or part of the above described methods and simulations using a processor such as processor 802. In other example, other software packages may be used. For example, any suitable programming language, development environment, software package, or the like may be used. Other examples of programming languages include PYTHON, C++, C, JAVASCRIPT, FORTRAN etc.

Indications of dimension parameter relating to a shock absorber dimension, such as minimum H-label 200, may be provided in the form of a hard copy label such as a sticker or the like, for example. Labels indicating dimension parameters may also be provided in electronic form. In some examples, a minimum H-label such as minimum H-label 200 may be provided in electronic form and stored in a computer readable storage medium. In some examples, an electronic minimum H-label may be stored in a computer readable storage medium held in an aircraft. For example, an electronic minimum H-label may be stored in a computer readable storage medium included in the computing system 103 of aircraft 100.

In some examples, current values of the operating characteristics shown in a generated minimum H-label for a shock absorber 102 fitted to the landing gear 101 of an aircraft 100 may be measured. For example, using the instruments 105 comprised within aircraft 100, the current aircraft mass and the current ambient temperature value may be measured. In other example, one or more measured current values of operating characteristics may be communicated to the computing system 103 of aircraft 100. For example, a user may input into the computing system 103 one or more measured current values of operating characteristics using an input device such as a keyboard etc. Based on these measurements, a first set of the plurality of sets of values may be identified based on the identified current values. For example, based on measurements from the instruments 105 on the aircraft 100 it may be determined that the aircraft mass is less than 175 tonnes and that the ambient temperature in greater than 40° C. Responsive to these determinations, the first set of values with respect to a generated minimum H-label such as minimum H-label 200 may be identified as "<175" aircraft mass in tonnes and "40+" ambient temperature in units of ° C. This comparison may be made using a generated minimum H-label that is in electronic form using computing system 103 of the aircraft 100, for example.

In these examples, the aircraft 100 may comprise an instrument, such as, for example, shock absorber dimension measuring device 118 provided on the shock absorber 102, for performing a measurement of the shock absorber H-dimension 116. Examples of such measuring devices comprise a potentiometer, an electromechanical device, a laser device and an ultrasound device among others. The measured value of the H-dimension 116 may then be compared to the minimum H-label value, for example, on the basis of an electronic minimum H-label, for the identified first set of values. For example, similarly to the minimum H-label 200, the generated minimum H-label for the first set of values may indicate a minimum H-dimension of 102 mm. If the measured H-dimension value is less than 102 mm, an indication that the measured value is lower than the minimum value for the identified first set of values may be provided. This indication may, for example, be provided by an indicating device 107 included in the aircraft 100. This indication may be provided in any suitable way, for example, using a warning light on the apparatus used to control the aircraft 100, a warning sound, and a visual indication on a display screen among others.

Thus, apparatus comprised within aircraft 100 as well as computing apparatus 800 may, for example, form part of a system for indicating a condition of a shock absorber fitted to an aircraft.

In some example, one or more of the probability distributions mentioned with respect to the method 300 may be updated using the measured current values of the operating characteristics. This allows for generation of minimum H-label that are more suited to particular aircraft or airlines.

Although the invention has been described above with reference to one or more preferred embodiments, it will be appreciated that various changes or modifications may be made without departing from the scope of the invention as defined in the appended claims.

The invention claimed is:

1. An apparatus for setting a dimension parameter relating to a value of a shock absorber dimension of a shock absorber of an aircraft landing gear, the shock absorber dimension being indicative of an extension of the shock absorber, the apparatus comprising:
   a processor configured to:
   identify a respective range of values relating to each of a plurality of operating characteristics under which the shock absorber may operate;
   identify a respective probability distribution of values for each of the operating characteristics within the identified ranges;
   perform a generation process for generating a plurality of values of the shock absorber dimension by repeatedly:
   (i) selecting, as input into a computer-implemented model for determining a value of the shock absorber dimension, a value of each of the operating characteristics based on the respective probability distributions; and
   (ii) determining a given value of the shock absorber dimension using the selected values and the computer-implemented model; and
   set the dimension parameter based on the generated plurality of shock absorber dimension values.

2. The apparatus according to claim 1, wherein the computer-implemented model comprises a model of the variation of the shock absorber dimension with load on the shock absorber, the plurality of operating characteristics comprises an aircraft mass and a position of aircraft centre of gravity, and the generation process comprises using the computer-implemented model to determine the shock absorber load based on the selected aircraft mass and selected aircraft centre of gravity.

3. The apparatus according to claim 2, wherein the plurality of operating characteristics comprises a temperature, and the generation process comprises determining a first value of the shock absorber dimension based on the determined shock absorber load and the selected temperature.

4. The apparatus according to claim 3, wherein the plurality of operating characteristics comprises a gas absorption factor relating to an absorption of gas contained in the shock absorber into liquid contained in the shock absorber, and the generation process comprises:
   determining an internal pressure of the shock absorber and an internal temperature of the shock absorber based on the selected values of the operating characteristics;
   determining an amount of absorption of the gas into the liquid when the liquid is fully saturated in the liquid at the determined internal pressure and the determined internal temperature;
   modifying the determined amount of absorption on the basis of the gas absorption factor to determine a gas absorption amount; and
   determining the given value of the shock absorber dimension on the basis of the determined gas absorption amount and the determined first value of the shock absorber dimension.

5. The apparatus according to claim 4, wherein the processor is configured to:
   perform a first iteration of the generation process based on a first determined shock absorber load value, comprising determining a first value of the gas absorption amount; and perform a second iteration of the generation process based on a second determined shock absorber load value and the first value of the gas absorption amount, the second determined shock absorber load value being higher than the first determined shock absorber load value.

6. The apparatus according to claim 1, wherein the processor is configured to generate a probability distribution of shock absorber dimensions based on the generated plurality of shock absorber dimension values and set the dimension parameter based on the generated probability distribution.

7. The apparatus according to claim 1, wherein the dimension parameter comprises a minimum value of the shock absorber dimension.

8. A system for indicating a condition of a shock absorber fitted to an aircraft, the system comprising an apparatus for setting a minimum value of a shock absorber dimension of a shock absorber of an aircraft landing gear, the shock absorber dimension being indicative of an extension of the shock absorber, the apparatus comprising:
- a processor configured to:
- identify a respective range of values relating to each of a plurality of operating characteristics under which the shock absorber may operate;
- identify a respective probability distribution of values for each of a plurality of operating characteristics under which the shock absorber may operate;
- perform a Monte Carlo simulation process to generate a plurality of minimum values of the shock absorber dimension by iteratively:
  (i) selecting, as input into a computer-implemented model for determining a value of the shock absorber dimension, a value of each of the operating characteristics based on the respective probability distributions; and
  (ii) determining a given value of the shock absorber dimension using the selected values and the computer-implemented model; and
- set a plurality of minimum values of the shock absorber dimension for a respective plurality of sets of values of at least some of the operating characteristics,
wherein the system further comprises:
- a computer readable storage medium for storing thereon the plurality of minimum values of the shock absorber dimension for the respective plurality of sets of values;
- a shock absorber dimension measuring device for acquiring a current value of the shock absorber dimension;
- one or more instruments for measuring current values of the at least some of the operating characteristics; and
- an indicating device for providing an indication that the measured current value of the shock absorber dimension is lower than the minimum value for a first set of values of the plurality of sets of values,
wherein the system is configured to:
- identify the first set of the plurality of sets of values based on the measured current values of the at least some of the operating characteristics; and
- determine whether or not the measured shock absorber dimension is lower than the minimum value for the identified first set and, if so, cause the indicating device to provide the indication.

9. The system according to claim 8, wherein the shock absorber dimension measuring device is one of: a potentiometer, an electro mechanical device, a laser device and an ultrasound device.

10. The system according to claim 8, wherein the processor is configured to update one or more of the probability distributions using the measured current values of the set of the plurality of operating characteristics.

11. A non-transitory computer readable storage medium having instructions stored thereon, which, when executed by a processor, cause the processor to perform a method of setting a dimension parameter relating to a value of a shock absorber dimension of a shock absorber of an aircraft landing gear, the shock absorber dimension being indicative of an extension of the shock absorber, the method comprising:
- identifying a respective range of values relating to each of a plurality of operating characteristics under which the shock absorber may operate;
- identifying a respective probability distribution of values for each of the operating characteristics within the identified ranges;
- performing a generation process for generating a plurality of values of the shock absorber dimension by repeatedly:
  (i) selecting, as input into a computer-implemented model for determining a value of the shock absorber dimension, a value of each of the operating characteristics based on the respective probability distributions; and
  (ii) determining a given value of the shock absorber dimension using the selected values and the computer-implemented model; and
  (iii) setting the dimension parameter based on the generated plurality of shock absorber dimension values.

12. The non-transitory computer readable storage medium according to claim 11, wherein the computer-implemented model comprises a model of the variation of the shock absorber dimension with load on the shock absorber, the plurality of operating characteristics comprises an aircraft mass and a position of aircraft centre of gravity, and the generation process comprises using the computer-implemented model to determine the shock absorber load based on the selected aircraft mass and selected aircraft centre of gravity.

13. The non-transitory computer readable storage medium according to claim 12, wherein the plurality of operating characteristics comprises a temperature, and the generation process comprises determining a first value of the shock absorber dimension based on the determined shock absorber load and the selected temperature.

14. The non-transitory computer readable storage medium according to claim 13, wherein the plurality of operating characteristics comprises a gas absorption factor relating to an absorption of gas contained in the shock absorber into liquid contained in the shock absorber, and the generation process comprises:
- determining an internal pressure of the shock absorber and an internal temperature of the shock absorber based on the selected values of the operating characteristics;
- determining an amount of absorption of the gas into the liquid when the liquid is fully saturated in the liquid at the determined internal pressure and the determined internal temperature;
- modifying the determined amount of absorption on the basis of the gas absorption factor to determine a gas absorption amount; and
- determining the given value of the shock absorber dimension on the basis of the determined gas absorption amount and the determined first value of the shock absorber dimension.

15. The non-transitory computer readable storage medium according to claim 14, wherein the method comprises:

performing a first iteration of the generation process based on a first determined shock absorber load value, comprising determining a first value of the gas absorption amount; and performing a second iteration of the generation process based on a second determined shock absorber load value and the first value of the gas absorption amount, the second determined shock absorber load value being higher than the first determined shock absorber load value.

16. The non-transitory computer readable storage medium according to claim 11, wherein the method comprises generating a probability distribution of shock absorber dimensions based on the generated plurality of shock absorber dimension values and setting the dimension parameter on the basis of the generated probability distribution.

17. The non-transitory computer readable storage medium of according to claim 16, wherein the method comprises determining a probability of the shock absorber dimension having a value below a given value, and setting said dimension parameter on the basis of the probability of the shock absorber dimension having the value below the given value.

18. The non-transitory computer readable storage medium according to claim 16, wherein:

the dimension parameter comprises a minimum value of the shock absorber dimensions, and the method further comprises:

determining a probability of the shock absorber dimension having a value below a given value, and setting the dimension parameter on the basis of the probability of the shock absorber dimension having the value below the given value;

setting a plurality of minimum values for a respective plurality of sets of values of at least some of the operating characteristics;

measuring current values of the at least some of the operating characteristics for a shock absorber fitted to an aircraft;

identifying a first set of the plurality of sets of values based on the identified current values;

performing a measurement of the shock absorber dimension on the aircraft; and determining whether or not the measured shock absorber dimension is lower than the minimum value for the identified first set and, if so, providing an indication that the measured shock absorber is lower than the minimum value for the identified first set.

19. The non-transitory computer readable storage medium according to claim 18, wherein the method comprises performing the measurement of the shock absorber dimension using at least one of: a potentiometer, an electro mechanical device, a laser device and an ultrasound device.

20. The non-transitory computer readable storage medium according to claim 18, wherein the method comprises updating one or more of the probability distributions using the measured current values of the operating characteristics.

* * * * *